S. B. ROWLEY.
Fruit-Jar Covers.
No. 134,400. Patented Dec. 31, 1872.
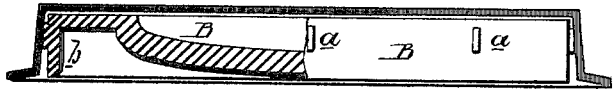
WITNESSES
J. S. Singer
Harry Smith
S. B. Rowley
By his Atty
Howson & Son

UNITED STATES PATENT OFFICE.

SALMON B. ROWLEY, OF PHILADELPHIA, PENNSYLVANIA.

IMPROVEMENT IN FRUIT-JAR COVERS.

Specification forming part of Letters Patent No. 134,400, dated December 31, 1872.

*To all whom it may concern:*

Be it known that I, SALMON B. ROWLEY, of the city and county of Philadelphia, State of Pennsylvania, have invented certain Improvements in Fruit-Jar Covers, of which the following is a specification:

My invention relates to an improvement in the fruit-jar cover for which Letters Patent were granted to me on the 3d day of September, A. D. 1872; and the object of my improvement is to provide means for retaining the glass cap in the metal cover, and yet permit the former to be withdrawn from the latter when necessary.

I attain this object by making on the edge of the glass cap B small and comparatively sharp ribs $a$, which, when the cap is inserted into the cover, will indent the metal and retain such a hold of the same that the cap will not be detached by ordinary handling, a slight effort being required to remove it. As in my former patent, the glass cap has a flange, $b$, for overlapping the mouth of the jar, and is fitted snugly to the inside of the metal cover. As the glass caps vary in size, however, to a limited extent, some will fit too loosely into the covers, and will become detached too easily. The small sharp ribs $a$, however, penetrate the metal on forcing the cap into the cover, and will retain their hold of the latter until an effort is made to remove them, when removal becomes necessary.

I claim as my invention—

The combination of the glass cap and its ribs $a$ with the metal cover B of a fruit-jar.

In testimony whereof I have signed my name to this specification in the presence of two subscribing witnesses.

S. B. ROWLEY.

Witnesses:
 WM. A. STEEL,
 JOHN K. RUPERTUS.